United States Patent [19]

Lynch et al.

[11] Patent Number: 4,698,413
[45] Date of Patent: Oct. 6, 1987

[54] ACRYLIC FIBER SUITABLE FOR PREPARING CARBON OR GRAPHITE FIBERS

[75] Inventors: Charles E. Lynch, Camden, S.C.; William K. Wilkinson, Waynesboro, Va.

[73] Assignee: E. I. Du Pont de Nemours and Company, Wilmington, Del.

[21] Appl. No.: 793,720

[22] Filed: Oct. 31, 1985

Related U.S. Application Data

[63] Continuation of Ser. No. 593,172, Mar. 26, 1984, abandoned, which is a continuation of Ser. No. 347,729, Feb. 10, 1982, abandoned, which is a continuation of Ser. No. 230,030, Jan. 30, 1981, Pat. No. 4,336,022, which is a continuation-in-part of Ser. No. 62,908, Aug. 1, 1979, abandoned.

[51] Int. Cl.$^4$ .............................................. C08F 28/00
[52] U.S. Cl. ............................... 525/328.5; 525/329.2; 525/378; 525/379; 525/380; 526/287; 526/75
[58] Field of Search ............... 525/336, 378, 379, 380, 525/328.5, 329.2; 526/287, 75

[56] References Cited

U.S. PATENT DOCUMENTS

| 2,758,003 | 8/1956 | Kleimer et al. | 8/115.5 |
| 3,260,707 | 7/1966 | Caldwell et al. | 526/287 |
| 3,473,881 | 10/1969 | Hallada | 8/21 |
| 3,810,878 | 5/1974 | Sato et al. | 526/287 |
| 3,814,577 | 6/1974 | Menikheim | 8/115.5 |
| 4,024,227 | 5/1977 | Kishimoto et al. | 423/447.4 |
| 4,154,807 | 5/1979 | Kishimoto et al. | 423/447.4 |

FOREIGN PATENT DOCUMENTS 53-7531 3/1978 Japan.

OTHER PUBLICATIONS

Research Disclosure No. 15728 (May 1977), p. 15.

Primary Examiner—Joseph L. Schofer
Assistant Examiner—Peter D. Mulcahy

[57] ABSTRACT

An acrylic fiber useful in the preparation of precursor fibers for the preparation of carbon or graphite fibers contains 93.0–99.4 mol percent acrylonitrile, 0.6–4.0 mol percent of ammonium or amine having a pKb of 5 or less as neutralizing cations for sulfonic and sulfuric acid end groups derived from the initiator and activator and as neutralizing cations for sulfonic acid groups derived from one or more sulfonic acid containing comonomers and 0–3.0 mol percent of one or more comonomers selected from the group consisting of simple acrylate or methacrylate esters, simply vinyl esters, styrene, vinyl chloride and vinylidene chloride, the fiber containing no more than 0.3 mol percent of cations other than ammonium or amine.

3 Claims, 5 Drawing Figures

ACRYLIC FIBER SUITABLE FOR PREPARING CARBON OR GRAPHITE FIBERS

This application is a continuation of application Ser. No. 593,172, filed Mar. 26, 1984, now abandoned; which is a continuation of application Ser. No. 347,729, filed Feb. 10, 1982, now abandoned; which in turn is a continuation of application Ser. No. 230,030, filed Jan. 30, 1981, now U.S. Pat. No. 4,336,022; which in turn is a continuation-in-part of application Ser. No. 62,908, filed Aug. 1, 1979, now abandoned.

FIELD OF THE INVENTION

This invention relates to an acrylic fiber suitable for use in a process for preparing a precursor fiber for production of carbon or graphite fibers.

Conversion of acrylic fibers to carbon or graphite fibers useful as reinforcing materials has been known for many years. In the known process, the acrylic fibers are first heated for one to two hours at 200°–300° C. in an oxidizing atmosphere to provide a cyclized precursor fiber which is then heated at 800°–1500° C. in an inert atmosphere to form carbon fibers or to even higher temperatures to form graphite fibers. This process is costly because of the slowness of the cyclization step.

Heating acrylic fibers in an oxidizing atmosphere causes formation of a cyclic structure consisting of naphthyridine rings and crosslinking. The naphthyridine ring-containing fibers are sufficiently resistant toward melting so that they can be heated at the high temperatures required to convert them to carbon or graphite fibers.

The temperature of the cyclization step is limited by the melting behavior of the fibers being treated. Use of relatively high temperatures in order to provide a higher rate of reaction causes difficulty in that the exothermic cyclization reaction is difficult to control, resulting in loss of fiber properties, fused filaments and nonuniformity in the product. Inclusion of various cross-linking comonomers in the acrylic fibers has been suggested as a way to increase the temperature resistance of the fibers so that the cyclization step can be carried out at a higher temperature.

Japanese Patent Application Publication No. (JPAP) 7531/78 suggests for the preparation of carbon fibers an acrylic fiber containing a cross-linking comonomer along with another comonomer which is the ammonium or amine salt of a sulfonic acid. Carbon fibers from this precursor fiber are alleged to be stronger and to provide greater interlaminar strength in resin composite structures. JPAP No. 7531/78 does not recognize any improvement in the rate of the cyclization reaction. Cross-linkable copolymers are undesirable in fiber-spinning processes in which the polymer solutions are heated as in dry spinning since premature cross-linking can occur resulting in gelation of the solution, causing serious economic penalty or even preventing manufacture.

This invention provides an acrylic fiber suitable for the preparation of carbon or graphite fibers which can be heated rapidly to high temperatures without interfilament fusion or loss of ultimate carbon or graphite fiber strength. Use of higher temperatures permits completion of the cyclization reaction in a much shorter time, thus making the cyclization process more economical.

The fiber of this invention is an acrylic fiber of an acrylic polymer containing 93–99.4 mol percent acrylonitrile units, 0.6–4.0 mol percent ammonia or amine having a pKb of 5 or less incorporated into the polymer as neutralizing cations for sulfuric or sulfonic acid end groups derived from the initiator and activator, if present, and as neutralizing cations for sulfonic acid groups incorporated into the polymer by copolymerization of one or more copolymerizable, sulfonic acid containing comonomers selected from the group consisting of styrene sulfonic acid, allyl sulfonic acid, methallyl sulfonic acid, 2-acrylamido-2-methylpropane sulfonic acid and ethylene sulfonic acid and 0–3.0 mol percent of units of one or more neutral comonomers selected from the group consisting of alkyl acrylates having 1–4 carbon atoms in the alkyl group, alkyl methacrylates having 1–4 carbon atoms in the alkyl group, vinyl acetate, vinyl propionate, styrene, vinyl chloride and vinylidene chloride and no more than 0.3 mol percent neutralizing cations other than ammonia or amine having a $pK_b$ of 5 or less. Preferably, the fibers contain no more than 0.1 mol percent of cations other than ammonium or amine. Preferably sulfuric or sulfonic acid end groups, when present, are derived from ammonium persulfate initiator and ammonium bisulfite activator.

Preferably the precursor fibers contain 0.8 to 2.0 mol percent sulfonic acid containing comonomer. Preferably the sulfonic acid containing comonomer is 2-acrylamido-2-methylpropanesulfonic acid (AMPS). Most preferably no neutral comonomer is present.

The above fibers are useful in a process for preparing precursor fibers for the preparation of carbon or graphite fibers wherein acrylic fibers are heated for 4–20 minutes in one or more stages in air at a temperature at least 10° C. below the stick temperature of the fibers entering that stage to provide fibers having a density of at least 1.36 g/cm³. Preferably the acrylic fibers are heated in air at 250°–360° C. Most preferably the process is continued until the precursor fibers have a density of at least 1.40 g/cm³.

DETAILED DESCRIPTION OF THE INVENTION

Figure 1:
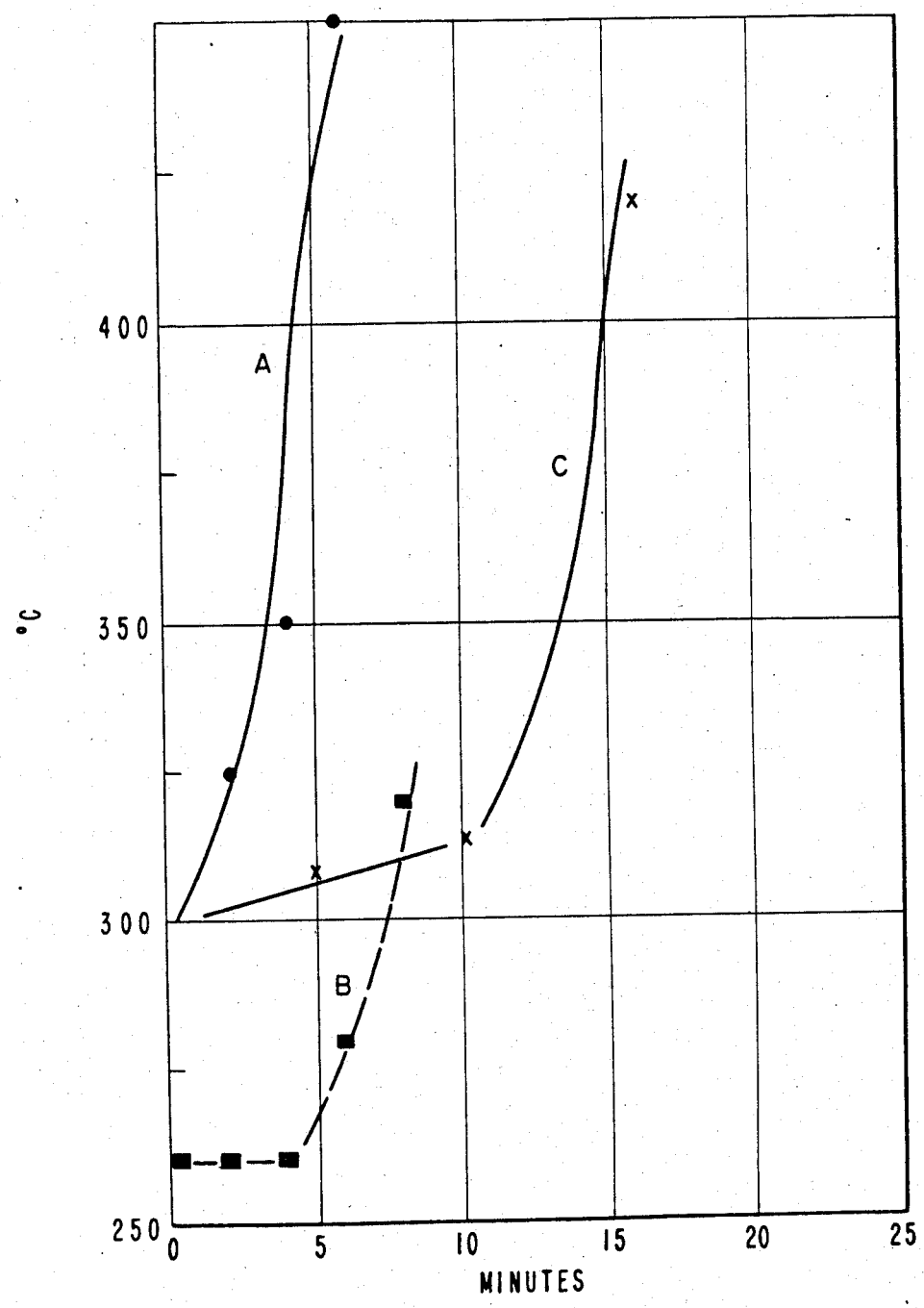
FIG. 1 shows a plot of fiber stick temperature against time for (1) an acrylic fiber containing 98.8 mol percent acrylonitrile and 1.2 mol percent 2-acrylamido-2-methylpropanesulfonic acid ammonium salt, (curve A), (2) an acrylic fiber containing 95.4 mol percent acrylonitrile, 0.8 mol percent itaconic acid and 3.8 mol percent methyl acrylate (curve B) and (3) an acrylic fiber containing 98.8 mol percent acrylonitrile and 1.2 mol percent sodium styrenesulfonate (curve C), all samples being heated in air, fibers (1) and (3) at 280° C. and fiber (2) at 250° C. (highest possible without damaging the fiber).

The acrylic fibers of this invention are useful in any process for the preparation of carbon or graphite fibers. They offer substantial advantages in the speed of cyclization, resulting in a significant reduction in the cost of the overall carbonization/graphitization processes. The largest improvement is realized by use of a temperature program during cyclization in which temperature is increased rapidly with the provision that it must never be higher than 10° below the increasing stick temperature of the fiber.

The cyclization reaction is substantially complete when the starting fibers having a density of about 1.18 g./cm.$^3$ have achieved a density of at least 1.36 g./cm.$^3$ and preferably at least 1.40 g./cm.$^3$. Such fibers are totally insoluble in hot polyacrylonitrile solvents. The cyclized intermediate fibers having a density of at least 1.36 g./cm.$^3$ may be converted to carbon or graphite fibers by methods known in the art, e.g., heating the intermediate fibers in an inert gas at 800°–1500° C. or higher for a short period of time. Carbon fibers will have a density of about 1.70 g./cm.$^3$ and graphite fibers ordinarily have a density in the range of 1.85–1.95 g./cm.$^3$.

Suitable sulfonic acid containing monomers are styrenesulfonic acid, allylsulfonic acid, methallylsulfonic acid, 2-acrylamido-2-methylpropane sulfonic acid, and ethylenesulfonic acid. The sulfonic acid containing monomers are preferably polymerized as the ammonium or amine salts but alternatively may be polymerized as the free acid or metallic salt and then converted to the ammonium or amine salt by ion exchange.

A fiber containing 1 mol percent alkali metal cation as copolymeric sulfonic acid will exchange about 0.8 mol percent of the alkali metal cation with ammonium ion on soaking 2 hours at room temperature in 5% aqueous ammonium sulfate.

Amounts of sulfonic acid ammonium or amine salt containing comonomer much greater than about 2 mol percent increase the water sensitivity of the starting fibers without providing much further increase in catalytic activity. For this reason, a maximum of 4 mol percent sulfonic acid containing monomers is specified.

Suitable amines for forming the amine salts are those amines having a pKb of 5 or less such as methyl, ethyl, dimethyl, diethyl, triethyl, ethanol, diethanol amines.

The ammonia or amine groups bound to the acrylic polymer chains via sulfonic acid groups are believed to act as catalysts in the cyclization reaction permitting a rapid increase in the resistance of the fibers to high temperatures. Ammonia or amine salts of sulfonic acid or sulfate end groups, when present, also act as catalysts. In the usual range of molecular weights, 0.2–0.35 mol % of ammonium or amine ion can be associated with end groups.

Acrylic polymers suitable for the preparation of the fibers of the present invention may be prepared by conventional free-radical polymerization procedures, such as systems employing redox catalysts, in suspension, solution or emulsion systems. Preferably, the polymerization is carried out in a system containing no metallic cations or at least a system containing only a low level of metallic cation less than 100 parts per million.

The acrylic fibers may be prepared by conventional solution-spinning processes such as dry spinning, wet spinning or dry-jet wet spinning. Dry spinning is preferred.

The acrylic fibers are preferably drawn 2 to 8 X. Drawing is preferably carried out in hot water (e.g. 90° C.) or in steam. The drawn fibers may be dried by conventional procedures but are preferably dried in a way providing precursor fibers having a density of about 1.18 g./cm.$^3$. If the acrylic fibers of the inventiom are to be prepared by ion exchange, this is preferably carried out on fibers which have not been dried and are still water swollen from the extraction and drawing steps of the manufacturing process.

Figure 2:
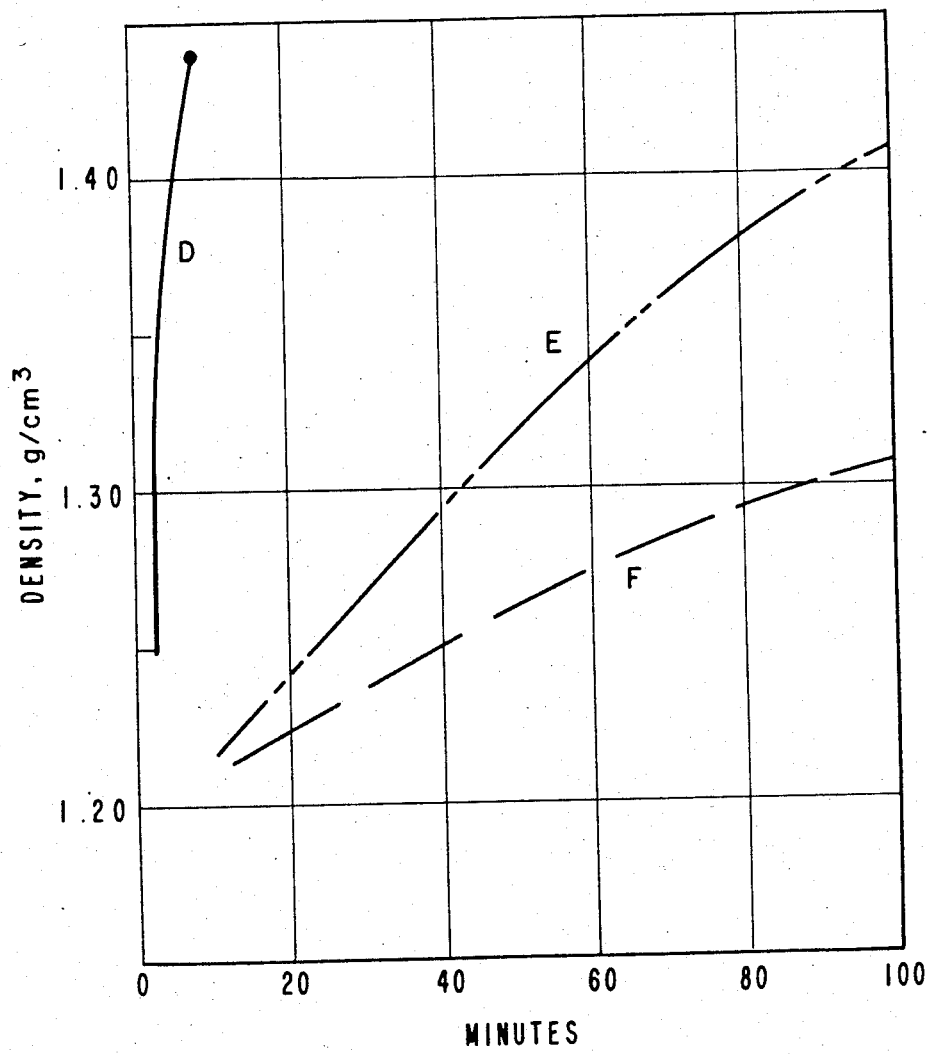
FIG. 2 is a plot of fiber density against time of heating in air for fiber (1) above heated at 270° C. for 2 minutes, 310° C. for four minutes and 360° C. for 2 minutes (curve D), for fiber (2) above heated at 250° C. (curve E), and for fiber (3) above heated at 250° C. (curve F).

From FIGS. 1 and 2 it can be seen that fibers useful in the process of the present invention are converted to substantially completely cyclized intermediate fibers having a density of at least 1.40 g./cm.$^3$. much more rapidly than other acrylic fibers.

Figure 3:
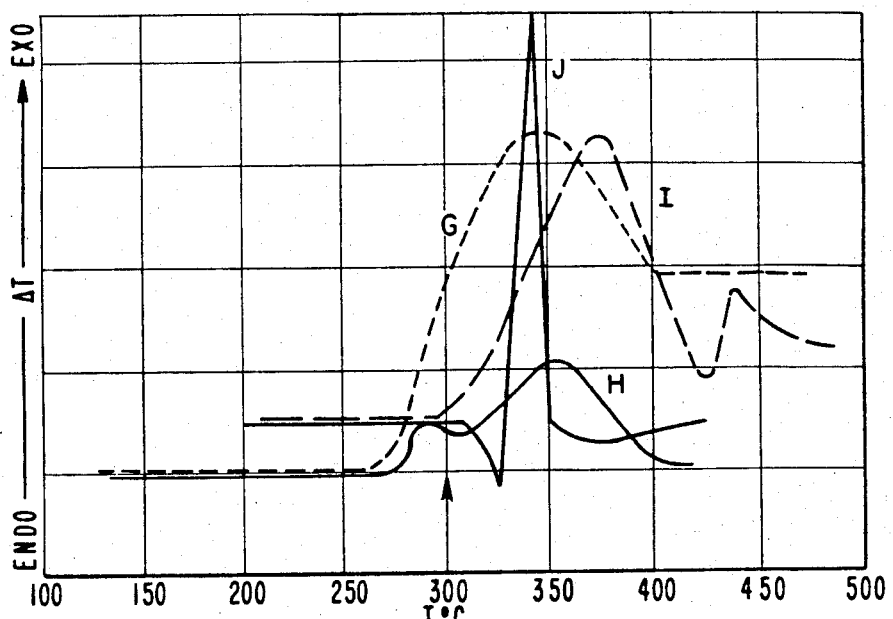
FIG. 3 shows differential thermal analysis curves obtained on heating two fiber samples in air or nitrogen at 50° C./min. Fiber (1) above is heated in air (curve G), and in nitrogen (curve H). Fiber (3) above is heated in air (curve I) and in nitrogen (curve J).

From FIG. 3 it can be seen that fibers useful in the process of the present invention undergo an exothermic reaction (cyclization) both in nitrogen and in air at a lower temperature than fibers not useful in the present invention and that a smaller exotherm occurs in a non-oxidizing atmosphere (nitrogen).

Figure 4:
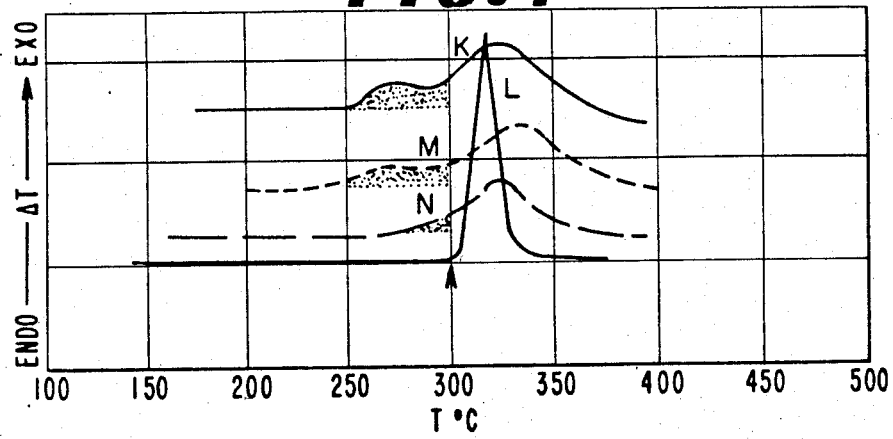
FIG. 4 shows a series of differential thermal analysis curves obtained at 20° C./min. under nitrogen for fibers of a polymer containing 98.8 mol percent acrylonitrile and 1.2 mol percent 2-acrylamido-2-methylpropane sulfonic acid as the ammonium salt (curve K), the sodium salt (curve L), 0.80 mol percent ammonium salt—0.40 mol percent sodium salt (curve M), and 0.64 mol percent ammonium salt—0.56 mol percent sodium salt (curve N).

From FIG. 4 it can be seen that an increasingly larger portion of the exothermic reaction occurs below 300° C., the intial stick temperature, as the amount of ammonium ion increases.

Figure 5:
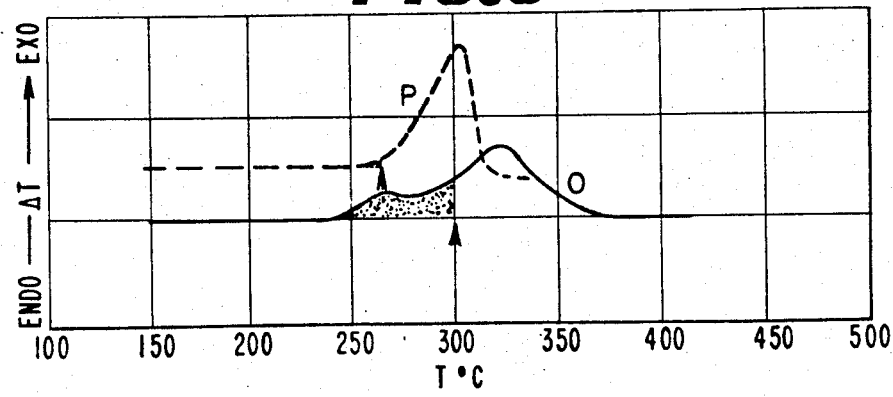
FIG. 5 shows differential thermal analysis curves obtained at 20° C./min under nitrogen for fiber (1) above (curve O) and fiber (2) above (curve P). Stick temperatures of the fibers are indicated by arrows below the curves.

From FIG. 5 it can be seen that a fiber according to the invention undergoes exothermic reaction below its stick temperature under nitrogen while a carbon fiber precursor of the prior art does not. It will be noted that all of the inert-atmosphere DTA curves for the product of this invention exhibit an exothermic reaction before the stick temperature is reached, which is unique for the composition. The comparison is best seen in FIG. 4 where a composition having no ammonium or amine neutralizing cations is compared with others having various levels of ammonium-ion content. Evidently, the low temperature reaction occurring in the fibers of the invention makes possible a faster conversion without filament fusion because the fiber stick temperature begins increasing at a lower temperature.

Tests

Differential Thermal Analysis

A discussion of differential thermal analysis (DTA) appears at p. 263, et seq., of *Physical Methods in Macromolecular Chemistry,* Carroll, Vol. 1, 1969, Marcel Dekker, authored by Feng and Freeman. The method provides a measure of the heat absorbed or generated in a sample as a function of temperature. In the present invention, this method provides a useful comparison of total heat and rate of the exothermic reaction leading to the "cyclized" form of an acrylic fiber which is suitable for rapid carbonization or graphitization at high temperature. The results are essentially identical whether polymer or fiber samples are used.

In this analysis, a 5 mg sample is placed in a sample cup which is in turn placed on one loop of the differential thermocouple in a DTA cell (the "Stone" cell, Traco Model SH-15BR2-Ni, is suitable, among others). An empty cup is placed on the other loop.

The temperature is programmed to rise at 20° C./min. or 50° C./min. from 100° C. to 400° C.

Density

Density determinations are made in calibrated density gradient tubes as known in the art. A container such as a standard 250 ml graduated cylinder contains a fluid prepared to have the desired density gradient and calibrated by the addition of "floats" of selected, known density. The fiber to be tested is knotted, the ends clipped and the knot dropped into the tube. When it has settled to its equilibrium level, its position is read in terms of proximity to calibration floats above and below it. Interpolation between these points gives the sample density.

Fiber Stick Temperature

The measurement of fiber stick temperature is an adaptation of the "*Procedure for Melting Point Determination*", ASTM D-276-62T. Two changes were made to improve accuracy in the measurement of stick temperature of a nonmelting fiber such as the fiber of this invention:

Temperature is measured with a reliable surface pyrometer rather than a submerged thermometer.

A convexly curved surface is used to heat the bare fibers; no cover glasses are used.

In the actual measurement, a strand of fibers is held against the convex surface for a maximum of 10 seconds. If sticking occurs, the temperature is dropped about 5° C. and the test repeated; if the filaments do not stick, the temperature is raised about 5° C. and the test repeated. A fresh sample is used for each test. Once sticking occurs, the tests are repeated at temperatures near this value until successive trials show incidence of sticking within a 2° C. range.

Polymer Preparation

The acrylonitrile polymers suitable for use in making the acrylic fibers of the present invention are preferably made in the conventional aqueous suspension system as generally taught in the Sampson et al. U.S. Pat. No. 3,308,109 with recipe modifications appropriate to production of the polymer useful in the present invention. This is a continuous, steady-state redox (e.g., bisulfite-activated/persulfate initiated) polymerization in which all ingredients are metered to an agitated, jacketed vessel, a representative portion of the contents overflowing constantly. Polymer and unreacted monomers are recovered from the overflowing slurry. The heat of reaction is removed by water circulating through the jacket.

PREPARATION A

The following ingredients are continuously fed:

| | Parts, by Weight, per Hour |
|---|---|
| Demineralized Water | 75 |
| Acrylonitrile | 23.3 |
| AMPS* | 1.67 (dissolved in part of the water feed) |
| SO$_2$ | 0.2 (dissolved in acrylonitrile) |
| (NH$_4$)$_2$S$_2$O$_8$ | 0.07 (dissolved in part of the water feed) |
| NH$_4$HSO$_3$ | 0.2 (dissolved in part of the water feed) |
| Fe$^{++}$ | 4 ppm (on feeds, as ferrous ammonium sulfate) |
| To overflowing slurry: Sodium-neutralized ethylene | in excess of that needed to complex the iron |
| diamine tetraacetic acid | |

*2-methyl-2-acrylamidopropanesulfonic acid neutralized to pH 2.5 with NH$_4$OH

The reactor has a working capacity to the continuous overflow of about 50 parts, resulting in a residence time of 30 minutes. The temperature is controlled at 60±1° C. The pH of the reacting mass is 2.6. The acrylamidomethylpropanesulfonic acid content of the polymer is 0.7 mol percent. The total ammonium ion content is 1.07 mol percent.

Overall conversion is found to be 78% of a polymer having an intrinsic viscosity of 1.11. The metal ion content is found by analysis to be <10 ppm (<0.002 mol % on polymer).

Two additional polymers are made as above, using feeds as follows:

| | Parts, by Weight, per Hour | |
|---|---|---|
| | B | C |
| Water | 80 | 80 |
| Acrylonitrile | 18.0 | 18.8 |
| AMPS | 2.0 | 1.2 |
| (NH$_4$)$_2$S$_2$O$_8$ | 0.06 | 0.06 |
| NH$_4$HSO$_3$ | 0.03 | 0.06 |
| Fe$^+$ | 2 ppm | 2 ppm |
| pH | 3.0 | 2.8 |
| Conversion | 80% | —* |
| Intrinsic Viscosity | 2.4 | 2.8 |
| AMPS Content** | 1.5 mol % | 0.74 mol % |
| Total Ammonium | 1.8 mol % | 0.92 mol % |

*Not determined; about equivalent to that of B.
**By X-ray fluorescence to give total sulfur and correction for the end groups calculated from the intrinsic viscosity It should be noted that the end groups derived from the initiator and activator are a significant proportion of the total ammonium- or amine-binding capacity. A polymer of lower molecular weight, thus requires less comonomeric sulfonic acid.

EXAMPLE I

Polymers are separately dry spun and wash drawn, as known in the art, to 1500-filament, 1.5 dpf yarns for this experiment. Polymer D is made by the prior art procedure, employing K$_2$S$_2$O$_8$ as initiator, sodium bisulfite as activator and sodium styrenesulfonate as the comonomer. Otherwise, the general procedure of the foregoing preparations is followed. Polymer E is prepared, as illustrated under the foregoing preparations. Polymer D contains 1.0 mol % of sodium styrenesulfonic acid. Polymer E contains 1.0 mol-% AMPS as the ammonium salt.

The yarns are passed continuously at constant length through a tubular furnace at such a rate as to reach a density of 1.4 g/cc in one pass. The yarn from Polymer D required 96 minutes residence at 270° C. and that of Polymer E 6 minutes, at a temperature profile from 270°–350° C.

Twelve-inch lengths of each yarn are placed, untensioned, in a muffle furnace under nitrogen and heated, over the course of 1 hour, to 1100° C. After 30 minutes at that temperature, the furnace is cooled to 200° C. over the course of 3 hours before exposing the carbonized yarns to air. The samples are measured for denier, to determine total cross-sectional area, and embedded in an epoxy resin.

Preparation of Epoxy Composite for Testing

1. Weigh 100 parts "Epon" 826 (a product of Shell Chemicals) and 14 parts of metaphenylenediamine into a glass container.
2. Dilute with 200 parts acetone. Mix well. This solution must be used within 2 hours after preparation.
3. Pour the solution into a pan of suitable size and into it coil an 18-inch (approximately 50 centimeters) or longer strand of a carbon (or graphite) yarn having a denier of about 1500 (166 tex).
4. Pull the impregnated strand through a glass, fire-polished, eye dropper having a minimum internal diameter of 0.060" (1.5 mm).
5. Clamp the ends of the impregnated, collimated strand between the arms of hinged clamps which have been coated with "Silastic" silicone rubber. The clamps can be made from common 4 inch iron strap hinges by securing two bolts to one side of each to permit convenient fastening with nuts after closing on the impregnated sample.
6. Hang the sample on a horizontal rack by attaching one of the closed clamps to one side of the rack, attaching a 4-pound (1.8 kg) weight to the second clamp and allowing this weighted end to drape across the other side of the rack, leaving about 15 inches (38.1 cm) of strand suspended across the opening. Allow the solvent to escape for 2 to 3 hours at room temperature.
7. Cure, without removing from the rack, at 120° C. for 2 hours and 155° C. for 4 hours in a circulating air oven.
8. Trim the ends of the strand and measure its length accurately; weight it to the nearest 0.1 milligram. From this weight, the known length and the known denier of the strand, establish that the resin content of the composite is about 40-50% before proceeding further.
9. Sandwich about 2 inches (5 cm) of each end of the strand between approximately 1"×2" (2.5×5 cm) pieces of cardboard along with additional epoxy resin; clamp the cardboard tabs together and re-cure as in (7) above. This procedure minimizes breakage of the brittle carbon fibers by the Instron clamp.
10. Test the composite to failure on an Instron in the known manner.

Properties are summarized in the following table.

| Composite of | Tensile Strength (× 1000 kg/cm$^2$) | Initial Modulus (× 10$^6$ kg/cm$^2$) |
|---|---|---|
| Fiber of Polymer D Cyclized in air, 96 min. | 10.9 | 1.1 |
| Fiber of Polymer E Cyclized in air, 6 min. | 9.1 | 0.8 |

EXAMPLE 2

Two additional polymers, F and G, are made by the process as generally described above to have intrinsic viscosities of 1.50 and 1.35, respectively. Polymer F consists essentially of 98.8 mol % acrylonitrile and 1.2 mol % sodium styrenesulfonic acid and serves as a comparison; polymer G consists essentially of 98.8 mol % acrylonitrile and 1.2 mol % ammonium 2-acrylamido-2-methylpropanesulfonic acid. Both polymers are dry spun into fibers which are drawn to 580% of their as-spun length to yield 700-filament yarns of 1.4 denier/filament.

Stabilization of these yarns is carried out by passing them continuously through a 36", three-zone tube furnace. Each 12" zone has independent temperature controls. Fibers are processed with equal input and exit speeds to achieve constant fiber length during stabilization. Hold-up time is set by selection of yarn speed. All fibers are stabilized under conditions tabulated below in an air atmosphere and have densities after treatment of 1.38-1.40 gm/cc.

| Fiber Composition | Process Temperature °C. | | | Hold-Up Time (Minutes) |
|---|---|---|---|---|
| | Zone 1 | Zone 2 | Zone 3 | |
| Polymer F | 255 | 260 | 270 | 90 |
| Polymer G - Run 1 | 250 | 270 | 300 | 60 |
| Polymer G - Run 2 | 250 | 270 | 300 | 30 |
| Polymer G - Run 3 | 250 | 270 | 300 | 24 |
| Polymer G - Run 4 | 250 | 270 | 300 | 17 |

Increase in Zone #2 or Zone #3 by 10° C. beyond those tabulated for treatment of the fiber of Polymer F cause filament fusion and breaks. Reduction in overall process time from 90 to 60 minutes for treatment of the fiber of polymer F results in fiber density below 1.36 gm/cc, the minimum density consistent with good carbonization performance.

After stabilization according to the conditions tabulated, each yarn is carbonized by passage through a 36 inch tube furnace heated to 1100° C. which is continuously flushed with nitrogen. Yarn speed is adjusted to provide 12-minutes exposure. The physical properties tabulated below are obtained after plotting the samples at 60% fiber, as described in Example 1 (elongation rate—10%/min).

| Composition | Denier | Tenacity | Elongation (%) | Initial Modulus |
|---|---|---|---|---|
| Polymer F | 515 | | | |
| gpd AVG | | 5.72 | 1.83 | 360 |
| kg/cm$^2$ | | 9.3 × 10$^3$ | — | 0.58 × 10$^6$ |
| psi | | 143 × 10$^3$ | — | 7 × 10$^6$ |
| Polymer G-Run 1 | 516 | | | |
| gpd avg | | 7.21 | 1.58 | 487 |
| kg/cm$^2$ | | 11.7 × 10$^3$ | — | 0.79 × 10$^6$ |
| psi | | 180 × 10$^3$ | — | 12.2 × 10$^6$ |
| Polymer G-Run 2 | 579 | | | |
| gpd avg | | 5.10 | 1.42 | 478 |
| kg/cm$^2$ | | 8.3 × 10$^3$ | — | 0.77 × 10$^6$ |
| psi | | 128 × 10$^3$ | — | 12.0 × 10$^6$ |
| Polymer G-Run 3 | 528 | | | |
| gpd avg | | 6.78 | 1.40 | 526 |
| kg/cm$^2$ | | 11.0 × 10$^3$ | — | 0.85 × 10$^6$ |
| psi | | 169.5 × 10$^3$ | — | 13.1 × 10$^6$ |
| Polymer G-Run 4 | 509 | | | |
| gpd avg | | 8.57 | 1.72 | 637 |
| kg/cm$^2$ | | 13.9 × 10$^3$ | — | 1.03 × 10$^6$ |
| psi | | 214 × 10$^3$ | — | 15.9 × 10$^6$ |

These data suggest that improved physical properties are obtained with the shortest possible stabilization times. Shorter stabilization times are also desirable for economic reasons.

For a continuous, commercial process, the shortest time of conversion can be selected for a given precursor fiber, as follows:

1. Determine the stick temperature of the acrylic fibers.
2. Heat samples of the fibers in air at a temperature 10° C. below the stick temperature for increasing periods of time such as 0.25, 0.5, 1.0 and 2 minutes using a fresh sample for each test and determine the density and stick-temperature for each sample.

3. From the data obtained in 2., select a new temperature 10° C. below the stick temperature of a sample for a second short-term treatment of that sample at various times at the new temperature.

4. Continuing in this manner, select a temperature for a third and a fourth, etc., incremental treatment, always starting the incremental treatment at about 10° C. below the then-attained fiber stick temperature.

5. Plot fiber stick temperature as a function of total time treatment. Select a rate of temperature change from the plotted data which results in continuous treatment at a temperature as near as possible to 10° C. below the then-attained stick temperature and program the furnace to operate at this rate.

If excessive fused filaments are obtained the rate of temperature increase should be descreased slightly. By optimization of the rate of temperature increase, treatments requiring 15-20 minutes as illustrated in the examples can be accomplished in as little as 6 or even 4 minutes.

I claim:

1. An acrylic fiber capable of being oxidized in one or more stages at a temperature of at least 10° C. below the stick temperature of fibers entering that stage to a density of at least 1.36 g/cm$^3$ in 4-20 minutes consisting essentially of 93-99.4% mol percent acrylonitrile units, 0.6-4.0 mol percent ammonium or amine salts having an intermediate amine having a pK$_b$ of 5 or less, as neutralizing cations for sulfuric or sulfonic acid end groups derived from the initiator and activator, if present, and as neutralizing cations for sulfonic acid groups incorporated into the polymer by copolymerization of one or more copolymerizable, sulfonic acid containing comonomers selected from the group consisting of styrene sulfonic acid, allyl sulfonic acid, methallyl sulfonic acid, 2-acrylamido-2 methylpropane sulfonic acid and ethylene sulfonic acid and substantially the remaining mol percent comprised of non-ionic vinyl comonomers and containing less than 100 parts per million of metallic cations.

2. The fiber of claim 1 containing 0.8-2.0 mol percent of sulfonic acid groups and ammonium or amine salts having an intermediate amine having a pK$_b$ of less than 5.

3. The fiber of claim 2 wherein the sulfonic acid group is 2-acrylamido-2-methyl propane sulfonic acid.

* * * * *